(12) United States Patent
Medeiros et al.

(10) Patent No.: US 11,703,485 B2
(45) Date of Patent: *Jul. 18, 2023

(54) BIOCOMPATIBLE COMPONENT WITH STRUCTURAL REINFORCEMENT

(71) Applicant: IDEX Health and Science, LLC, Oak Harbor, WA (US)

(72) Inventors: David Medeiros, Bridgewater, MA (US); Scott Ellis, Anacortes, WA (US); Eric Beemer, Anacortes, WA (US); Jason Polly, Oak Harbor, WA (US)

(73) Assignee: IDEX Health & Science LLC, Oak Harbor, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/235,444

(22) Filed: Apr. 20, 2021

(65) Prior Publication Data

US 2021/0239657 A1 Aug. 5, 2021

Related U.S. Application Data

(63) Continuation-in-part of application No. 15/947,256, filed on Apr. 6, 2018, now Pat. No. 11,221,315.

(Continued)

(51) Int. Cl.
*G01N 30/32* (2006.01)
*F04B 53/16* (2006.01)
*F04B 19/04* (2006.01)

(52) U.S. Cl.
CPC ............. *G01N 30/32* (2013.01); *F04B 19/04* (2013.01); *F04B 53/16* (2013.01); *G01N 2030/326* (2013.01)

(58) Field of Classification Search
CPC ... G01N 30/6017; F04B 53/16; F04B 53/166; F04B 19/04; F04B 15/00; F04B 37/12;

(Continued)

(56) References Cited

U.S. PATENT DOCUMENTS 5,472,598 A * 12/1995 Schick .................. B01D 15/08
210/656
7,144,502 B2 12/2006 Fermier et al.
(Continued)

FOREIGN PATENT DOCUMENTS

DE 3122091 12/1982
DE 102010037662 3/2012
(Continued)

OTHER PUBLICATIONS

Japanese Application No. JP2019-554974, Office Action, dated Dec. 10, 2021, 9 pages.

(Continued)

*Primary Examiner* — John Fitzgerald
*Assistant Examiner* — Gedeon M Kidanu
(74) *Attorney, Agent, or Firm* — Kilpatrick Townsend & Stockton LLP

(57) ABSTRACT

A structural reinforcement and biocompatible pump head for a pump includes a reinforcement structure having a plurality of ports and fluid pathways therein. The fluid pathways in the reinforcement may be coated or lined with a biocompatible material to form a biocompatible pump head useful for liquid chromatography and other analytical instrument systems. The biocompatible material may be injection molded into the fluid pathways of the reinforcement structure and may be machined after core pins are removed to obtain a desired surface finish and/or size of the biocompatible fluid pathways of the pump head.

22 Claims, 10 Drawing Sheets

Related U.S. Application Data

(60) Provisional application No. 62/543,151, filed on Aug. 9, 2017, provisional application No. 62/483,277, filed on Apr. 7, 2017.

(58) Field of Classification Search
CPC .............. F04B 53/168; B29C 45/0001; B29C 45/14622; B01D 15/22; B29K 2071/00; B29K 2995/0073; B29K 2995/0056; B29K 2705/12; B29L 2031/7506; B29L 2031/7496; B01L 2300/163
See application file for complete search history.

(56) References Cited

U.S. PATENT DOCUMENTS

| | | | |
|---|---|---|---|
| 7,311,502 B2 | 12/2007 | Gerhardt et al. | |
| 8,173,078 B2 | 5/2012 | Yao et al. | |
| 9,151,734 B2* | 10/2015 | Ellis | G01N 30/6039 |
| 9,188,569 B2* | 11/2015 | Graham | G01N 30/6039 |
| 9,201,049 B2* | 12/2015 | Beemer | B01L 3/563 |
| 9,457,504 B2* | 10/2016 | Beemer | G01N 30/26 |
| 9,700,816 B2* | 7/2017 | Liu | B01D 19/0031 |
| 9,791,080 B2 | 10/2017 | Graham | |
| 11,221,315 B2* | 1/2022 | Medeiros | F04B 15/00 |
| 2005/0191212 A1 | 9/2005 | Antocci et al. | |
| 2012/0024411 A1* | 2/2012 | Hahn | F16L 19/06 138/140 |
| 2012/0160754 A1 | 6/2012 | Falk-Jordan | |
| 2012/0223520 A1* | 9/2012 | Graham | G01N 30/6039 285/332 |
| 2012/0223522 A1* | 9/2012 | Graham | F16L 19/00 285/385 |
| 2013/0234432 A1* | 9/2013 | Graham | F16L 19/0237 285/136.1 |
| 2014/0260565 A1* | 9/2014 | Imamura | F04B 13/00 92/170.1 |
| 2016/0018001 A1 | 1/2016 | Satzinger et al. | |
| 2016/0220997 A1 | 8/2016 | Mescher et al. | |
| 2018/0292363 A1* | 10/2018 | Medeiros | F04B 15/00 |

FOREIGN PATENT DOCUMENTS

| | | | |
|---|---|---|---|
| FR | 2965181 | 3/2012 | |
| JP | 2003161675 | 6/2003 | |
| JP | 2007056804 | 3/2007 | |
| JP | 2007113439 | 5/2007 | |
| JP | 2013180545 A | 9/2013 | |
| JP | 5472598 B2 * | 4/2014 | ............... F21K 9/00 |
| JP | 2016518587 | 6/2016 | |
| WO | 2013088487 A1 | 6/2013 | |
| WO | 2013089147 | 6/2013 | |

OTHER PUBLICATIONS

Japanese Application No. JP2019-554974, Notice of Allowance, dated Feb. 2, 2022, 3 pages.
U.S. Appl. No. 15/947,256, Final Office Action dated Mar. 16, 2021, 16 pages.
U.S. Appl. No. 15/947,256, Non-Final Office Action dated May 19, 2020, 16 pages.
European Application No. EP18780891.0, Extended European Search Report dated Jan. 26, 2021, 8 pages.
European Application No. EP18780891.0, Partial Supplementary European Search Report dated Oct. 12, 2020, 8 pages.
International Application No. PCT/US2018/26507, International Preliminary Report on Patentability dated Oct. 17, 2019, 6 pages.
International Application No. PCT/US2018/26507, International Search Report and Written Opinion dated Jun. 11, 2018, 6 pages.
JP2022-45185, "Office Action", dated Mar. 27, 2023, 9 pages.

* cited by examiner

SECTION A-A

DETAIL B

SECTION A-A

SECTION A-A

BIOCOMPATIBLE COMPONENT WITH STRUCTURAL REINFORCEMENT

CROSS-REFERENCE TO RELATED APPLICATION

This application is a continuation in part of U.S. non-provisional patent application Ser. No. 15/947,256, filed on Apr. 6, 2018, which claims the benefit of and priority to U.S. provisional patent application No. 62/483,277, filed on Apr. 7, 2017, and also U.S. provisional patent application No. 62/543,151, filed on Aug. 9, 2017, each of which is hereby incorporated by reference herein.

FIELD OF THE INVENTION

This invention relates generally to an improved biocompatible component and methods of making same for use in liquid chromatography and other analytical systems, and relates more particularly to a pump head, pump, check valve, or the like with a structural reinforcement and one or more biocompatible fluid passageways that are useful in a wide variety of fittings or assemblies.

BACKGROUND OF THE INVENTION

Liquid chromatography (LC), ion chromatography (IC) and gas chromatography (GC) are well-known techniques used in analytical systems for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase. LC and related technologies, and associated tubing, ports, fittings, and other components are discussed in U.S. patent application Ser. No. 13/206,873 (published as US 2012/0024411), Ser. No. 13/292,667 (published as US 2012/0223520), and Ser. No. 13/686,260 (entitled "microfluidic interconnect"), each of which is incorporated herein by reference.

In a conventional LC system, the sample and mobile phase pass through one or more filters and often a guard column before coming to the column. A typical column usually consists of a piece of tubing which has been packed with a "packing" material. The "packing" consists of the particulate material "packed" inside the column. It usually consists of silica- or polymer-based particles, which are often chemically bonded with a chemical functionality. When the sample is carried through the column (along with the mobile phase), the various components in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

Once the sample (with its components now separated) leaves the column, it flows with the mobile phase past a detector, which can be built using MEMS technology. The detector detects the presence of specific molecules or compounds. Two general types of detectors are typically used in LC applications. One type measures a change in some overall physical property of the mobile phase and the sample (such as their refractive index). The other type measures some properties of only the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample. Additionally, LC systems may utilize mass spectrometric detection for identification and quantification of the sample, either in addition to, or as an alternative to, the conventional detectors described previously. Ion chromatography relies on the detection of ions in solution, so most metallic materials in the flow path can create interference in the detection scheme, as they create background ions.

In addition to the above components, an LC system will often include filters, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column.

In practice, various components in an LC system may be connected by an operator to perform a given task. For example, an operator will select an appropriate mobile phase and column, and then connect a supply of the selected mobile phase and a selected column to the LC system before operation. In order to be suitable for high performance liquid chromatography (HPLC) applications, each connection must be able to withstand the typical operating pressures of the LC system. If the connection is too weak, it may leak. Because the types of solvents that are sometimes used as the mobile phase are often toxic and because it is often expensive to obtain and/or prepare many samples for use, any such connection failure is a serious concern. A high pressure fitting is further discussed in U.S. patent application Ser. No. 13/038,110 (published as U.S. Patent Publication No. US 2012/0223522 A1), the contents of which are incorporated herein by reference.

Most conventional HPLC systems include pumps which can generate relatively high pressures of up to around 5,000 psi to 6,000 psi or so. In many situations, an operator can obtain successful results by operating an LC system at "low" pressures of anywhere from just a few psi or so up to 1,000 psi or so. More often than not, however, an operator will find it desirable to operate a LC system at relatively "higher" pressures of over 1,000 psi. If a connection does not have sufficient structural strength, it could leak at higher pressures.

Another, relatively newer liquid chromatography form is Ultra High Performance Liquid Chromatography (UHPLC) in which system pressure extends upward to 1400 bar or 20,000 psi. Both HPLC and UHPLC are examples of analytical instrumentation that utilize fluid transfer at elevated pressures. For example, in U.S. Pat. No. 8,173,078 (entitled "Sample Injector System for Liquid Chromatography"), an injection system is described for use with UHPLC applications, which are said to involve pressures in the range from 20,000 psi to 120,000 psi. In U.S. Pat. No. 7,311,502 (entitled "Method for Using a Hydraulic Amplifier Pump in Ultrahigh Pressure Liquid Chromatography"), the use of a hydraulic amplifier is described for use in UHPLC systems involving pressures in excess of 25,000 psi. In U.S. Pat. No. 7,144,502 (entitled "Chromatography System with Gradient Storage and Method for Operating the Same"), a system for performing UHPLC is disclosed, with UHPLC described as involving pressures above 5,000 psi (and up to 60,000 psi). Applicants hereby incorporate by reference as if fully set forth herein U.S. Pat. Nos. 7,311,502; 7,14,502; and 8,173,078.

Given the desirability of need for leak-free connections, conventional connections have been made with stainless steel tubing and stainless steel end fittings. More recently, however, it has been realized that the use of stainless steel components in a LC system can have potential drawbacks in situations involving biological samples, and cannot be routinely used for ion chromatography. For example, the components in a sample may attach themselves to the wall of stainless steel tubing. This can present problems because the detector's measurements (and thus the chromatogram) of a given sample may not accurately reflect the sample if some of the sample's components or ions remain in the tubing and do not pass the detector. Perhaps of even greater concern, however, is the fact that ions from the stainless steel tubing may detach from the tubing and flow past the detector, thus leading to potentially erroneous results. Hence, there is a need for biocompatible connections through the use of a material that is chemically inert with respect to such biological samples and the mobile phase used with such samples, so that ions will not be released by the tubing and thus contaminate the sample. Such connections and tubing are further described in U.S. patent application Ser. No. 13/206,873 (published as US 2012/0024411), the contents of which are incorporated herein by reference.

In many applications using selector/injector valves to direct fluid flows, and in particular in liquid chromatography, the volume of fluids is small. This is particularly true when liquid chromatography is being used as an analytical method as opposed to a preparative method. Such methods often use capillary columns and are generally referred to as capillary chromatography. In capillary chromatography, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques, for example, historically often involved samples of about one microliter to about 100 milliliters in volume. Thus, the micro-fluidic techniques described herein involve volumes one or more orders of magnitude smaller in size than traditional LC techniques. Micro-fluidic techniques can typically be expressed as those involving fluid flow rates of about 0.5 ml/minute or less.

As noted, liquid chromatography (as well as other analytical instrument) systems typically include several components. For example, such a system may include a pump, an injection valve or autosampler for injecting the analyte, a precolumn filter to remove particulate matter in the analyte solution that might clog the column, a packed bed to retain irreversibly adsorbed chemical material, the LC column itself, and a detector that analyzes the carrier fluid as it leaves the column. Ion chromatography may also utilize a suppressor column to facilitate detection dynamic range. These various components may typically be connected by a miniature fluid conduit, or tubing, such as metallic or polymeric tubing (for ion chromatography), usually having an internal diameter of 0.003 to 0.040 inch.

It will be understood by those skilled in the art that, as used herein, the term "LC system" is intended in its broad sense to include all apparatus and components in a system used in connection with a liquid chromatography system (including but not limited to HPLC or UHPLC), and that the discussion of components in the context of LC systems is exemplary, as the invention may apply beyond LC systems to gas and ion chromatography, as well as in vitro diagnostic (IVD) or environmental analysis, and in other analytical instruments (AI) and systems, and may be made of only a few simple components or made of numerous, sophisticated components which are computer controlled or the like. Those skilled in the art will also appreciate that an LC system is one type of an AI system. For example, gas chromatography is similar in many respects to liquid chromatography, but obviously involves a gas sample to be analyzed. Although the following discussion focuses on liquid chromatography, those skilled in the art will appreciate that much of what is said with respect to LC systems also has application to gas chromatography, ion chromatography, and other types of AI systems and methods. Other such AI systems and methods may include, for example, lab on a chip, printing, sensors, micro chromatography, biochemical detection, mass spectrometry, biological sensing, drug discovery, drug delivery, molecular separation, proteomics, fuel cells, optics and opto-fluidics, and research tools.

Increasing pressure requirements in liquid chromatography have necessitated the use of high pressure fluidic components. For many applications regular stainless steel tubing is typically used to withstand the high pressure, such as those in excess of 12,000 psi or so. However, for some types of analyses (e.g., biological testing and metal/ion analysis), stainless steel or other metals are not desired in the fluid path as the metal could interfere with the testing. For example, some methods use corrosive salts which can be incompatible with steel, and the stainless steel can react at an ion level with the chemicals used in the mobile phase of separation. Additionally, there are some fields of use (e.g., nano-scale or nano-volume analysis), that require very small inside diameters to accommodate the extremely low volumes required by these applications. Such small inside diameters are typically not available in stainless steel or other high pressure tubing. Traditional materials utilized for instruments targeting biochemistry and ion chemistry have been PEEK and fluoropolymer (e.g., PTFE, ETFE, PFA, FEP, and PCTFE). However, such materials are limited in pressure capability by the yield strength of the material.

In U.S. Pat. No. 9,201,049 B2 (issued on Dec. 1, 2015, and titled "Connector with Structural Reinforcement and Biocompatible Fluid Passageway") and U.S. Pat. No. 9,457,504 B2 (issued Oct. 4, 2016, and titled "Column Filter Retainer "Connector with Structural Reinforcement and Biocompatible Fluid Passageway"), certain biocompatible components are described, which include a connector with a passageway that is both structurally reinforced and biocompatible for use with an analytical instrument (AI) system. The connector has both a reinforcement insert and a biocompatible molding covering portions of the reinforcement insert. The reinforcement insert provides structural strength to the connector, while the molding provides biocompatibility and are described as capable of withstanding operating pressures above 12,000 psi, and even operating pressures above 25,000 psi. Both of U.S. Pat. Nos. 9,201,049 B2 and 9,457,504 B2 are hereby incorporated by reference as if fully set forth herein.

SUMMARY OF THE INVENTION

This disclosure describes and illustrates a structural reinforcement and biocompatible pump head for a pump useful for liquid chromatography and other analytical instrument systems, which may include a reinforcement structure having a plurality of ports and fluid pathways therein. The fluid pathways in the reinforcement may be coated or lined with a biocompatible material to form a biocompatible pump head useful for liquid chromatography and other analytical instrument systems. The biocompatible material may be injection molded into the fluid pathways of the reinforcement structure and may be machined after core pins are removed to obtain a desired surface finish and/or size of the biocompatible fluid pathways of the pump head. The biocompatible pump head is capable of operation at high pressures and with a variety of samples and solvents.

In one embodiment, the present disclosure comprises a biocompatible pump head for a pump, with the biocompatible pump head comprising a structural reinforcement for a pump head, wherein the reinforcement comprises a reinforcing material and has at least two fluid pathways therethrough and has at least one additional fluid pathway therein, with the pump head further comprising a biocompatible layer lining each of the at least two fluid pathways of said reinforcement. The reinforcing material may comprise metal, alloys of one or more metals, ceramics, polymeric materials with carbon-fiber or other fibers therein, and/or polymeric materials, or combinations thereof, and/or the biocompatible layer may comprise a polymer such as polyetheretherketone (PEEK). The biocompatible pump head may be able to withstand pressures of at least 5,000 psi, 10,000 psi, 15,000 psi, or 20,000 psi.

In another embodiment, the present disclosure provides an analytical instrument system comprising a pump, wherein said pump further comprises a pump head base comprising a reinforcing material and having at least two fluid pathways therethrough and having at least one additional pathway therein and having a biocompatible layer lining each of the at least two fluid pathways of said pump head base, wherein said reinforcing material comprises metal, alloys of one or more metals, ceramics, polymeric materials with carbon-fiber or other fibers therein, and/or polymeric materials, or combinations thereof, and said biocompatible layer comprises a polymer such as polyetheretherketone (PEEK). The pump head of such an analytical instrument system may be able to withstand pressures of at least 5,000 psi, 10,000 psi, 15,000 psi, or 20,000 psi. The analytical instrument system may comprise a liquid chromatography system, an ion chromatography system, a high pressure liquid chromatography system, an ultra-high pressure liquid chromatography system, or a gas chromatography system.

The present disclosure also includes methods for forming a biocompatible component for an analytical instrument system, wherein such methods may comprise one or more of the following steps: providing a component base comprising and having at least two fluid pathways therethrough and having at least one additional pathway therein, injecting a biocompatible material through the at least one additional pathway of the component base and allowing the biocompatible material to create a lining surface lining interior surfaces of the at least two fluid pathways of the component base, and machining the lining surface to provide a desired surface finish, which may be about 0.8 μm average surface roughness ($R_a$) or better. The biocompatible material of the methods may comprise PEEK or other biocompatible materials. In addition, the component may comprise a pump head or a check valve or other type of valve. The method may also include the steps of inserting one or more core pins into at least portions of the at least two fluid pathways and at least one additional pathway, and removing the one or more core pins after the step of injecting the biocompatible material. The step of injecting a biocompatible material may comprise injection molding.

DETAILED DESCRIPTION

Figure 1:
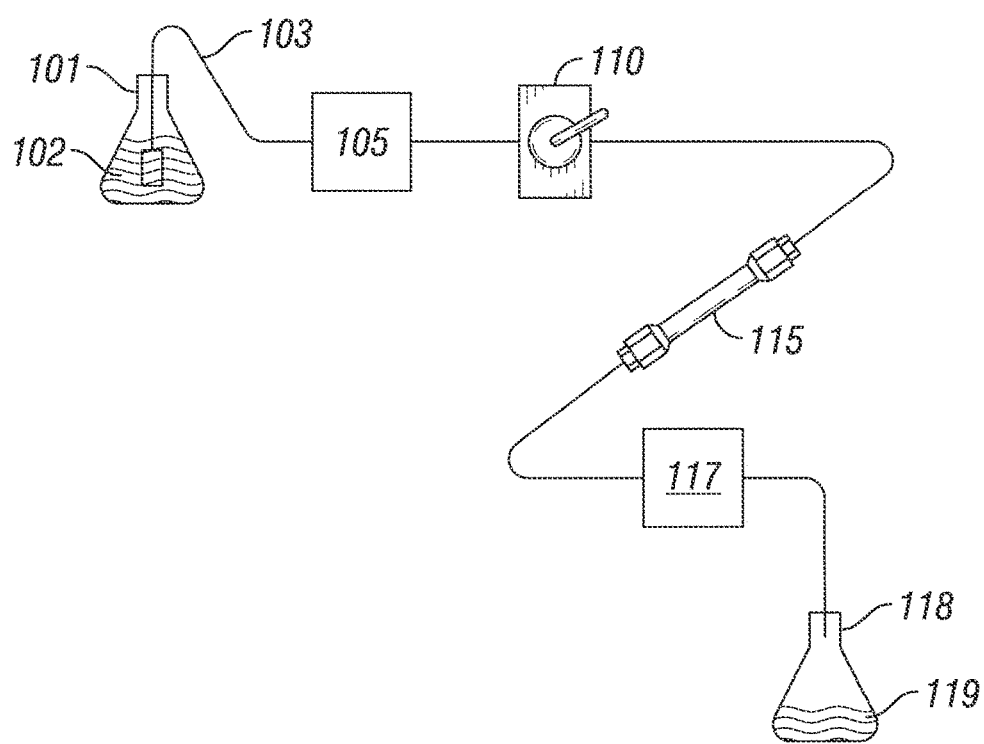
FIG. 1 is a schematic diagram of a liquid chromatography system.

In FIG. 1, a block diagram of certain elements of a conventional liquid chromatography (LC) system is provided. A reservoir 101 contains a solvent or mobile phase 102. Tubing 103 connects the mobile phase 102 in the reservoir 101 to a pump 105. The pump 105 is connected to a sample injection valve 110 which, in turn, is connected via tubing to a first end of a guard column (not shown). The second end of the guard column (not shown) is in turn connected to the first end of a primary column 115. The second end of the primary column 115 is then connected via tubing to a detector 117. After passing through the detector 117, the mobile phase 102 and the sample injected via injection valve 110 are expended into a second reservoir 118, which contains the chemical waste 119. As noted above, the sample injection valve 110 is used to inject a sample of a material to be studied into the LC system. The mobile phase 102 flows through the tubing 103 which is used to connect the various elements of the LC system together.

When the sample is injected via sample injection valve 110 in the LC system, the sample is carried by the mobile phase through the tubing into the column 115. As is well known in the art, the column 115 contains a packing material which acts to separate the constituent elements of the sample. After exiting the column 115, the sample (as separated via the column 115) then is carried to and enters a detector 117, which detects the presence or absence of various chemicals. The information obtained by the detector 117 can then be stored and used by an operator of the LC system to determine the constituent elements of the sample injected into the LC system. Those skilled in the art will appreciate that FIG. 1 and the foregoing discussion provide only a brief overview of a simplistic LC system that is conventional and well known in the art, as is shown and described in U.S. Pat. No. 5,472,598, issued Dec. 5, 1995 to Schick, which is hereby incorporated by reference as if fully set forth herein. Those skilled in the art will also appreciate that while the discussion herein focuses on a LC system (which includes HPLC and UHPLC), other analytical instrument (AI) systems can be used in connection with various embodiments of the invention, such as a mass spectrometry, microflow chromatography, nanoflow chromatography, nano-scale liquid chromatography, capillary electrophoresis, or reverse-phase gradient chromatography system.

Figure 2A:
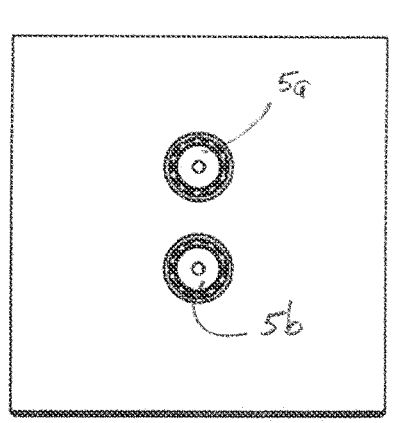
FIGS. 2A-2C are, respectively, top, front, and bottom views of a structural reinforcement for a pump head in accordance with an embodiment of the present disclosure.
Figure 2B:
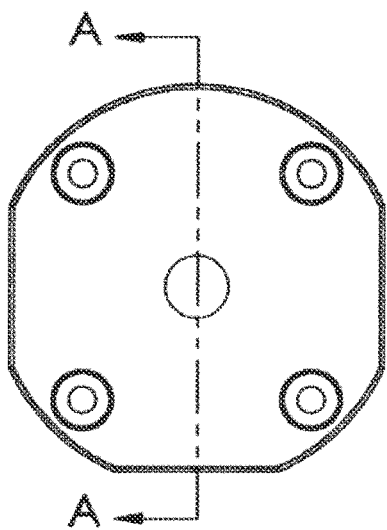
Figure 2C:
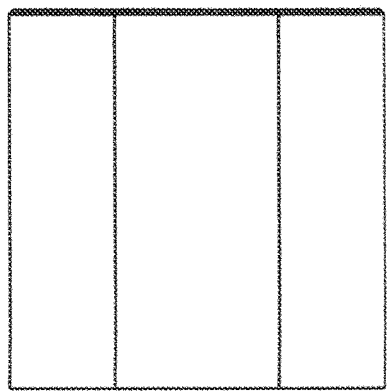
Figure 3:
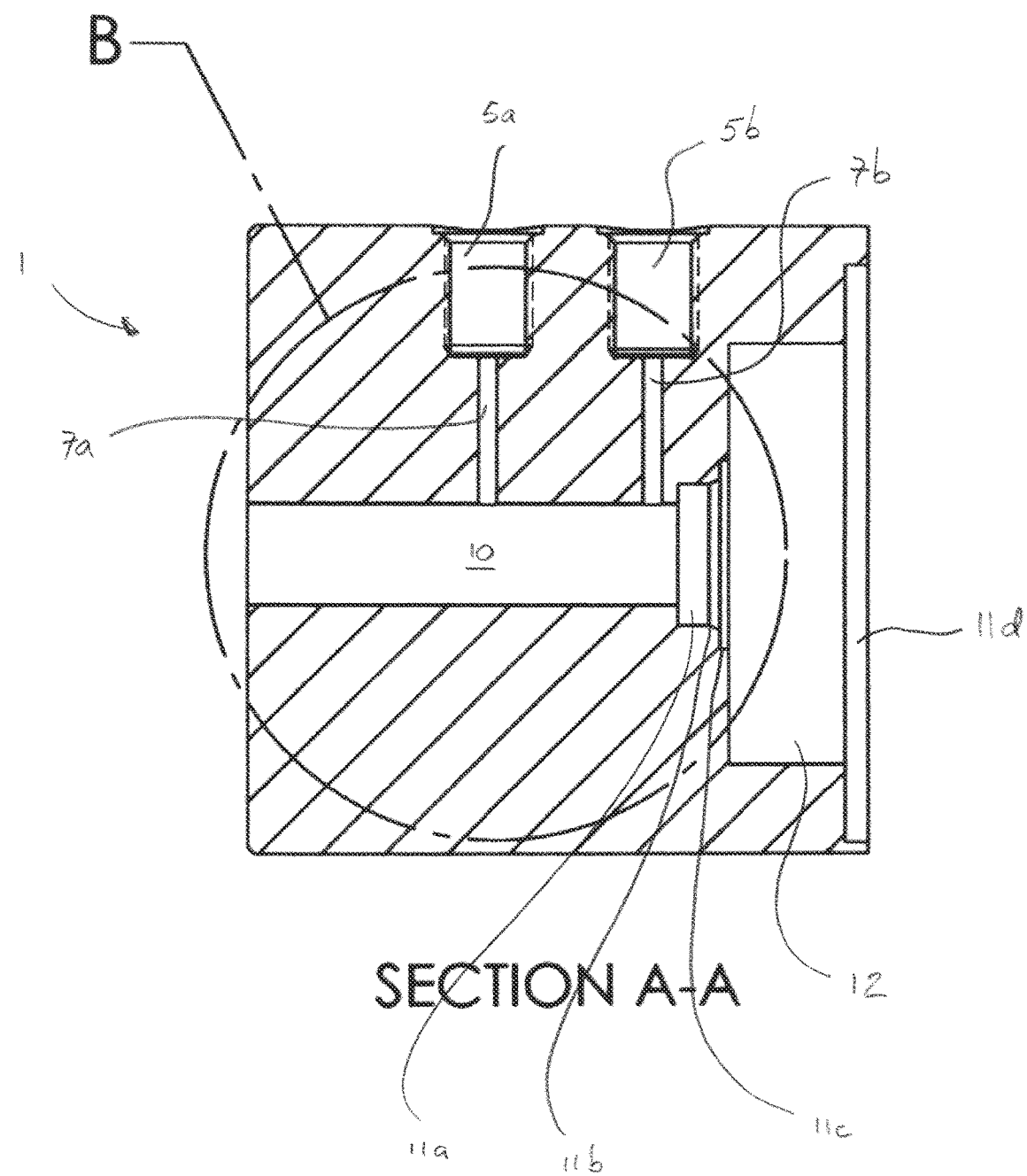
FIG. 3 is a cross-sectional view of the reinforcement taken along line A-A of FIG. 2B.
Figure 4:
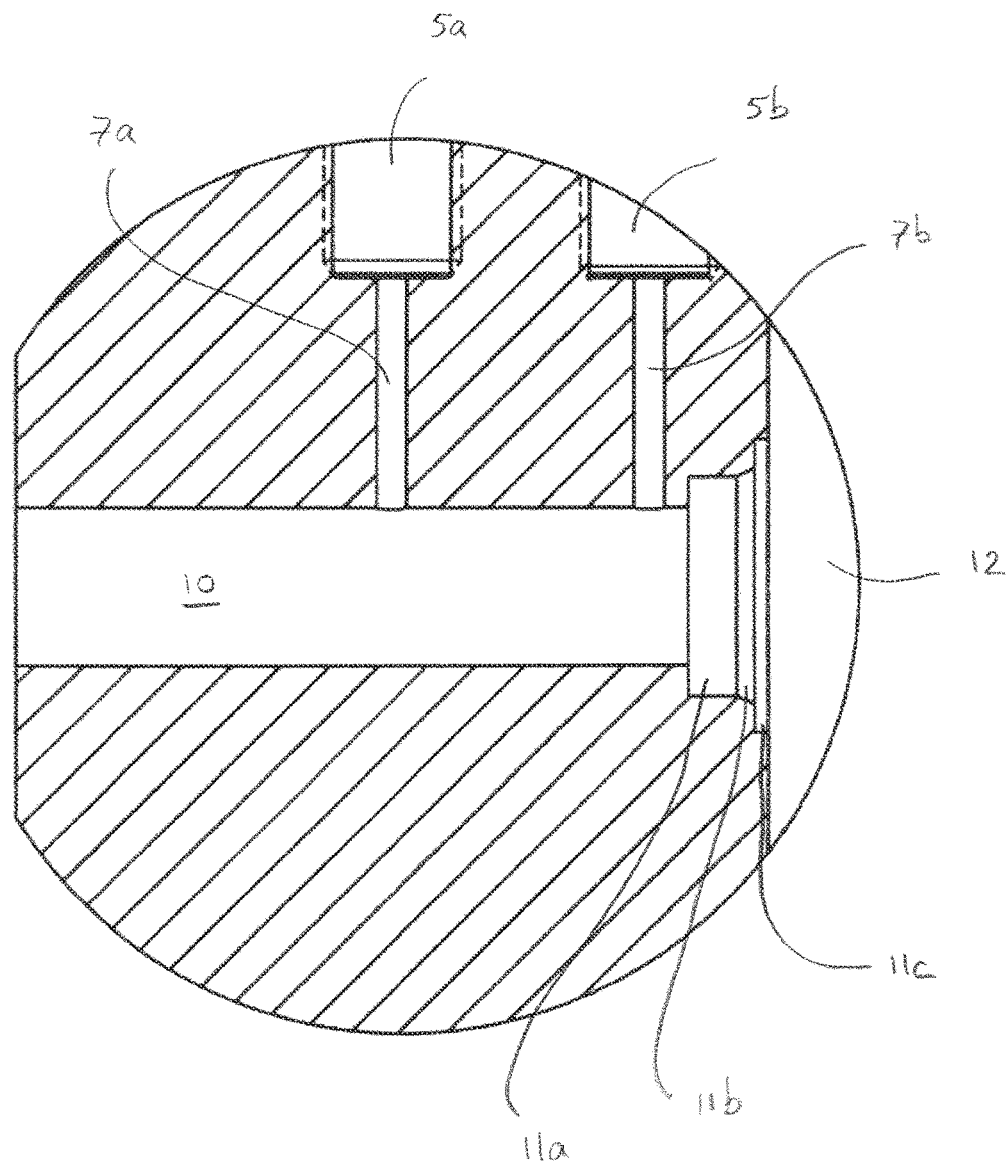
FIG. 4 is a detailed cross-sectional view of a portion of the reinforcement of FIG. 3.
Figure 5A:
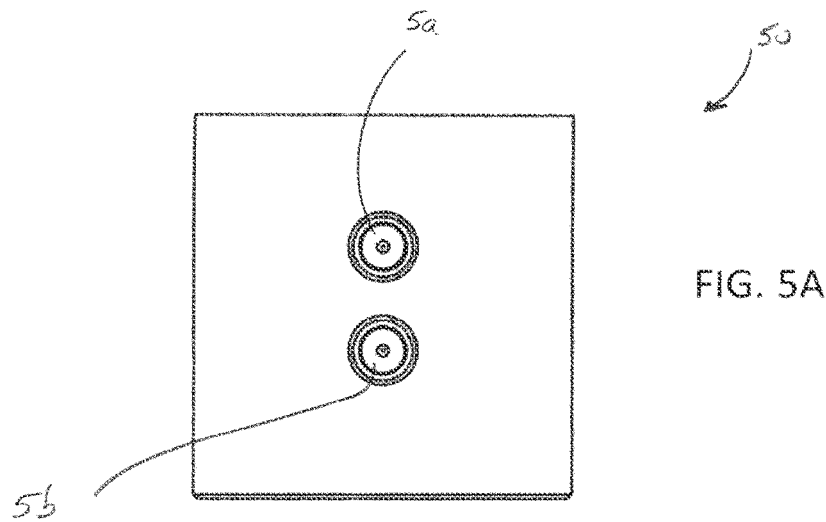
FIGS. 5A-5C are, respectively, top, front, and bottom views of an inert or biocompatible pump head in accordance with an embodiment of the present disclosure.
Figure 5B:
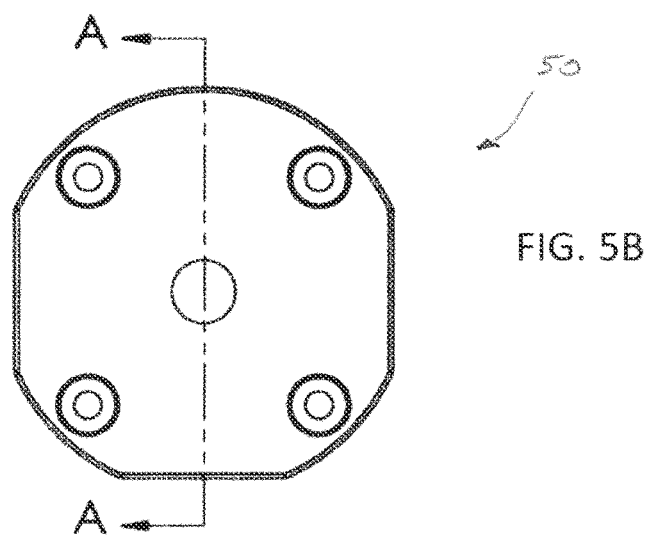
Figure 5C:
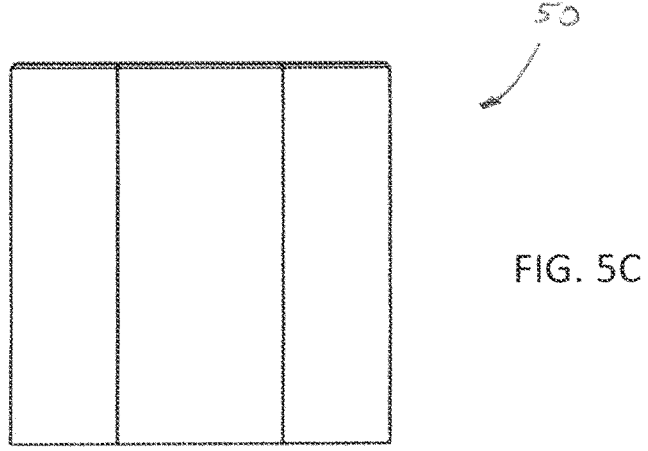

FIGS. 2-4 illustrate a structural reinforcement 1 for use for a pump head in accordance with one specific example embodiment. FIGS. 2A-2C show, respectively, top, front, and bottom views of the reinforcement or pump head base 1. The pump head reinforcement 1 illustrated can be made of a material (e.g., a reinforcing material), such as a metal (e.g., stainless steel, aluminum, titanium), alloys of one or more metals, ceramics, carbon-fiber (e.g., carbon-fiber reinforced PEEK), and/or polymeric material, or a combination of some or all of the foregoing. Polymeric materials may include composite or braided materials, such as polymeric materials that include or are braided with fibers such as carbon fibers, steel fibers, basalt fibers, or the like. The carbon, carbon fibers, steel fibers, or other fibers (e.g., basalt fibers), may comprise anywhere from 5%, 10%, 20%, 30%, 40%, or 50% by weight or by volume of the reinforcing material. Ceramics that may be used include, for example, aluminum oxide, zirconium oxide, and yttrium-stabilized zirconium oxide.

In various embodiments, the pump head base 1 can be machined to form pathways in the pump head base 1. The pump head base 1 can additionally or alternatively be 3D printed, cast, and/or molded with the pathways. As shown in FIGS. 3 and 4, the pump head base 1 provides a reinforcement shape having at least two internally threaded ports 5a and 5b therein, with the bottom of each of the ports having a pathway 7a, 7b extending therefrom to a central passageway 10 in the pump head base 1. As shown, the central passageway 10 extends through the pump reinforcement 1 and, at one end, ends in a portion 12 with a wider diameter. As also shown, the central passageway 10 includes a series of different portions 11a, 11b, 11c, 11d, and 12, each having different diameters. The different portions of the central passageway 10 with differing diameters, such as shown in FIGS. 3-4, may define the outline of a seat for removably receiving a piston of a pump (not shown) which is adapted to cooperate with the biocompatible pump head.

In one embodiment, a biocompatible material, such as polyetheretherketone (PEEK), may be injection molded into the pump head base 1 to provide a biocompatible coating or lining of the fluid pathways and the central passageway 10 of the pump head base 1. The biocompatible coating thus lines the fluid pathways of the reinforcement 1 and provides a biocompatible pump head 50 (shown in FIGS. 5A-5C and 6) such that, when used in an analytical instrument system, a fluid sample will not come into contact with the reinforcing material but will instead only come into contact with the biocompatible material (e.g., PEEK in this particular example). In various embodiments, the reinforcing material may have a texture or porosity or be of a chemical nature that improves the adhesion of the biocompatible layer to the reinforcing material. For example, the material and/or method of producing the pump head base 1 can improve adhesion of the biocompatible layer to the reinforcing material.

It should be noted that, in addition to or instead of PEEK, one or more other or additional biocompatible materials may be used for the biocompatible coating, including any one or more of the following: polyetherketoneketone (PEKK), reinforced PEEK (e.g., reinforced or braided with carbon, carbon fibers, glass fibers, steel fibers, or the like), polyetherimide (PEI), polyphenylene sulfide (PPS), polypropylene, sulfone polymers, polyolefins, polyimides, other polyaryletherketones, other fluoropolymers, polyoxymethlyene (POM), polytetrafluorethylene (PTFE), ethylene tetrafluoroethylene (ETFE), perfluoroalkoxy alkane (PFA), fluorinated ethylene propylene (FEP), polychlorotrifluoroethylene (PCTFE), or combinations of any or all of the foregoing.

In certain embodiments, the biocompatible coating can include materials which can increase strength, improve chemical resistance, improve temperature stability, or reduce permeability. Such coatings can include, but are not limited to, metallization, polymeric coating, silicon-based coatings, and carbon-based coatings. Additionally, in certain embodiments the biocompatible coating may be heat treated to improve properties such as crystallinity, chemical resistance, or permeability. In some embodiments, the reinforcing material and the biocompatible coating material may comprise one or more materials in common, may different materials, or the same materials with different characteristics (such as PEEK with carbon fibers). In various embodiments, the reinforcing material can comprise a greater volume of carbon fibers per unit volume or per weight than the biocompatible material. The inclusion of carbon fiber can increase the modulus of PEEK or any polymer such that the material is structurally stronger than the pure native polymer. In some embodiments, the amount of reinforcement and the improvement in the modulus of the support material can be based on the target pressure range of the biocompatible pump head.

A method for making a biocompatible pump head in accordance with the present disclosure includes providing a pump head reinforcement 1, which may comprise a reinforcing material such as stainless steel or another metal, a ceramic material, or a polymeric materials, such as polyetheretherketone having carbon fibers (or fibers of other materials) therein, with the reinforcement having at least two ports 5a, 5b therein and having a central passageway 10, with pathways 7a, 7b providing fluid communication between the bottoms of the ports 5a, 5b and the central passageway 10, such as is shown in FIGS. 3 and 4. Core pins (not shown) may be inserted into at least portions of the at least two ports 5a, 5b and/or at least a portion of the central passageway 10. Once the core pin or pins have been placed as may be desired, a biocompatible material may be injected (such as by injection molding) into the opening of the top portion of the central passageway 10 of the pump head reinforcement 1. Alternatively, the biocompatible material may be added to the reinforcement 1 through one or more additional or different openings, including any one or more of ports 5a, 5b. As noted, the biocompatible material may comprise a polymer such as polyetheretherketone (PEEK). When the PEEK is injection molded into the pump head base 1, the PEEK will flow around the core pins and will coat the interior walls of the central passageway 10 and the fluid pathways 7a, 7b connecting the bottoms of the ports 5a, 5b and the central passageway 10, as shown in FIG. 3 with the coated state illustrated in FIGS. 6 and 7. The biocompatible material may be allowed to cool and harden. Alternatively, the reinforcement 1 with the added biocompatible material may be cooled, such as refrigeration, exposure to cold air or liquid, or the like. The core pin or pins may then be removed. Once the core pin or pins are removed, additional machining (such as drilling) may be done to create fluid pathways through the biocompatible material in the pathways 7a, 7b connecting the bottoms of the ports 5a, 5b with the central passageway 10. In addition, machining some or all of the interior surface of the biocompatible lining may be appropriate to achieve a desired surface finish for the biocompatible lining surfaces.

It should be noted that the biocompatible pump head 50, due to the pump head base 1, is capable of operation as part of a pump that is able to withstand a wide variety of corrosive chemicals typically found in analytical chemistry, operating in a wide range of temperatures (e.g., −40 to 140° C.), and operating up to very high pressures, including up to at least 5,000 psi, 10,000 psi, 15,000 psi, and 20,000 psi.

After the biocompatible material is injection molded or otherwise added into the pump head base 1, the resulting pump head 50 may be machined further, such as by milling, turning, or laser machining. The lining of the biocompatible material may be about 0.2 to 2.0 millimeters in thickness and that the surface finish of the lining of biocompatible material be about 0.05 to 0.8 µm average surface roughness ($R_a$).

Figure 6:
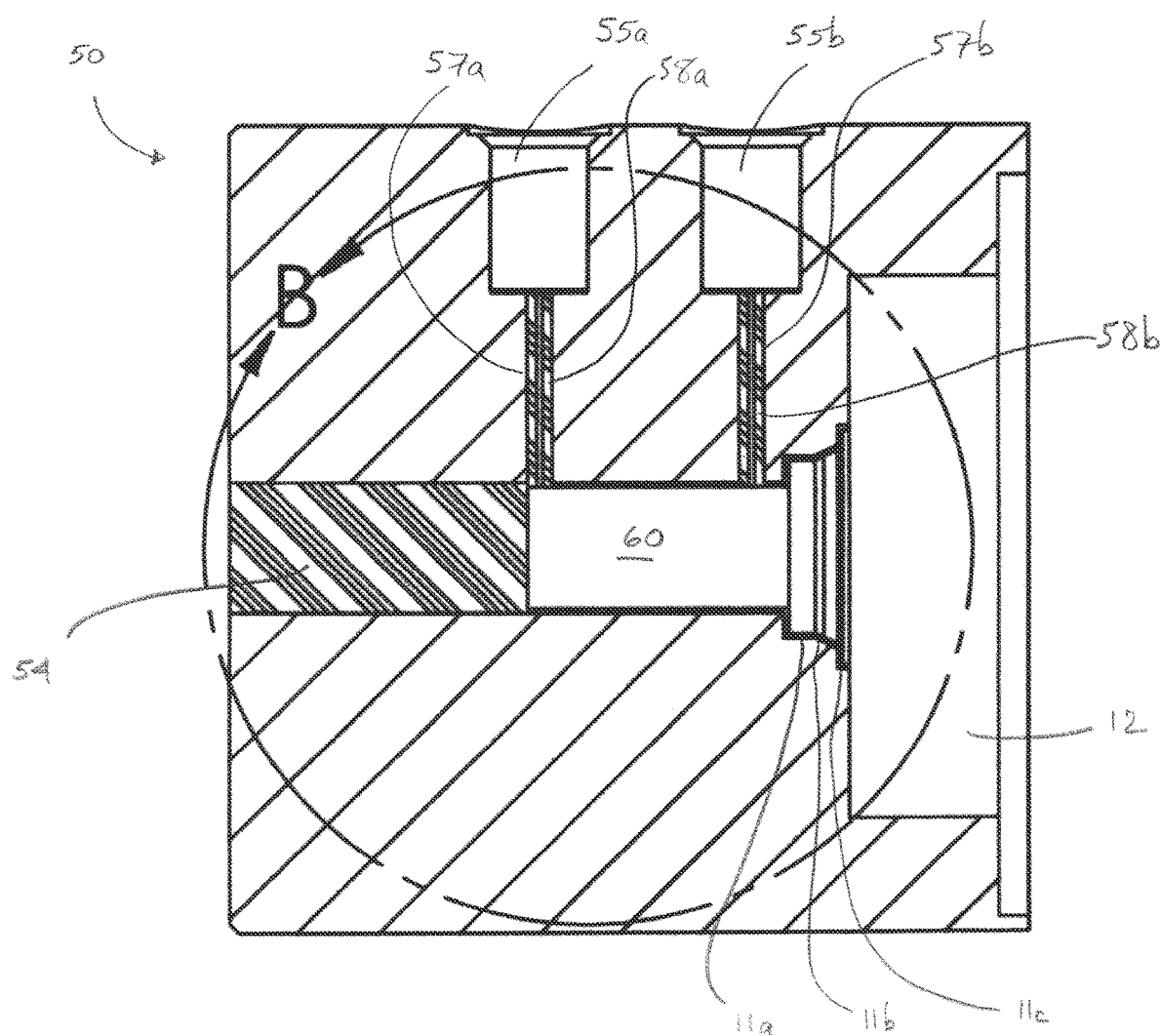
FIG. 6 is a cross-sectional view of the pump head taken along line A-A of FIG. 5B.
Figure 7:
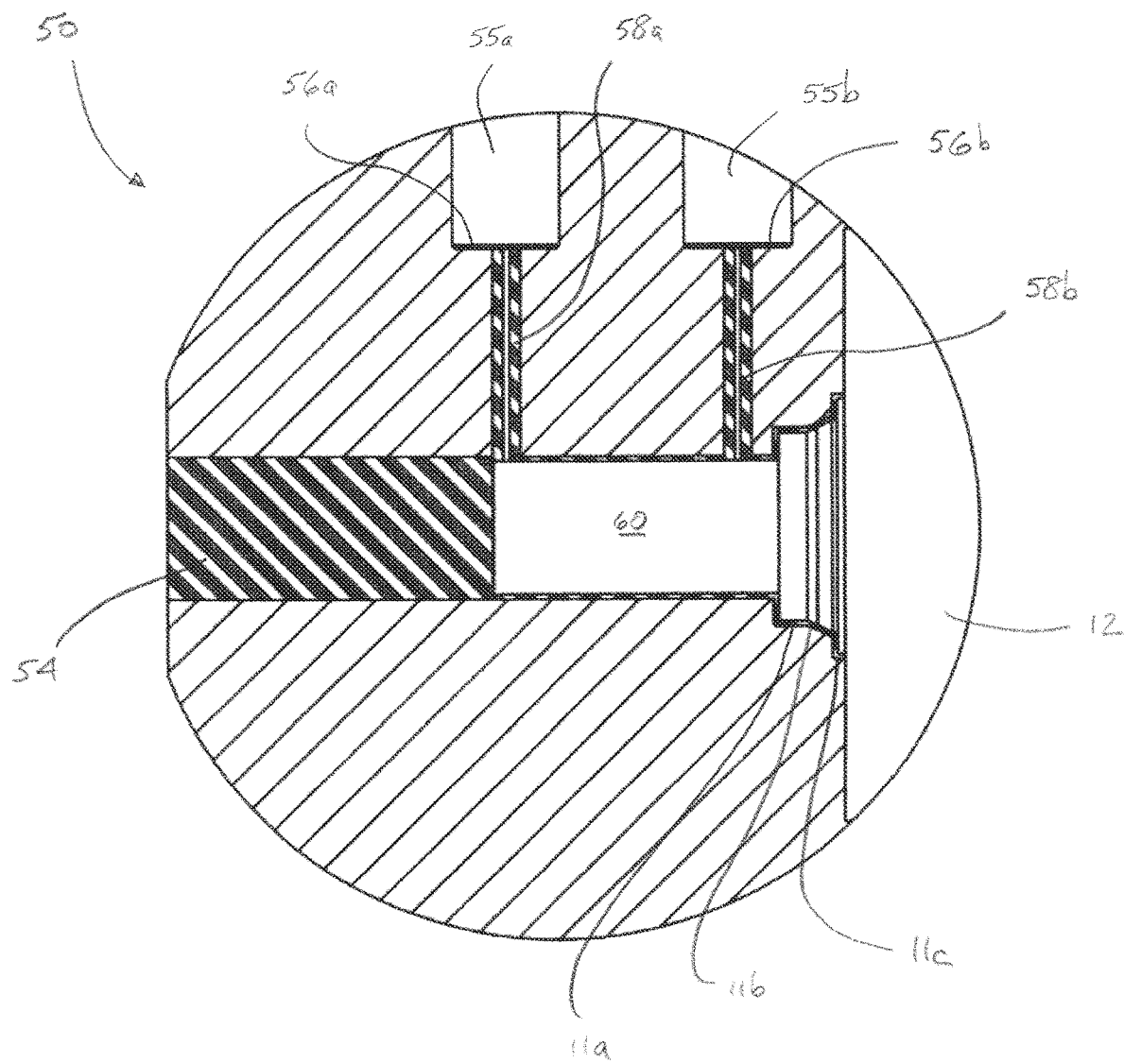
FIG. 7 is a detailed cross-sectional view of a portion of the pump head of FIG. 6.

FIGS. 5-7 illustrate a biocompatible pump head 50 in accordance with the present disclosure. As shown in FIGS. 5-7, the fluid pathways 57a, 57b connecting the bottoms of the ports 55a, 55b in the pump head 50 to the central passageway 60 of the pump head 50 each have a lining 58a, 58b, respectively, formed by a biocompatible material (such as PEEK), so that any fluid flowing through the bottoms of the ports 55a, 55b, the fluid pathways 57a, 57b, and the central passageway 60 will not contact the reinforcing material but will only come into contact with the biocompatible material (which is PEEK in this example).

In FIG. 6, it can be seen that the biocompatible material 54 now fills up a portion of the central passageway 10 (see FIGS. 3 and 4) of the reinforcement, leaving a fluid pathway 60 extending partially through the pump head 50. FIG. 6 also shows that the interior surfaces of the portions 11a, 11b, and 11c of the pump head 50 are lined or coated with the biocompatible material.

In FIG. 7, it can be seen that the bottoms of ports 55a, 55b can include a biocompatible coating or lining 56a, 56b, respectively. The core pins (not shown) can be selected to be of an appropriate size and shape and placed appropriately to provide for the desired biocompatible flow pathways and also for coating (or not coating, as the case may be) some or all of the ports 55a, 55b.

Figure 8A:
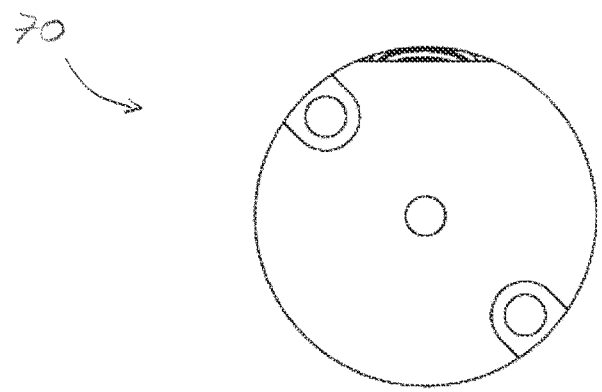
FIGS. 8A-8C are, respectively, top, front, and bottom views of a structural reinforcement for a pump head in an alternative embodiment in accordance with the present disclosure.
Figure 8B:
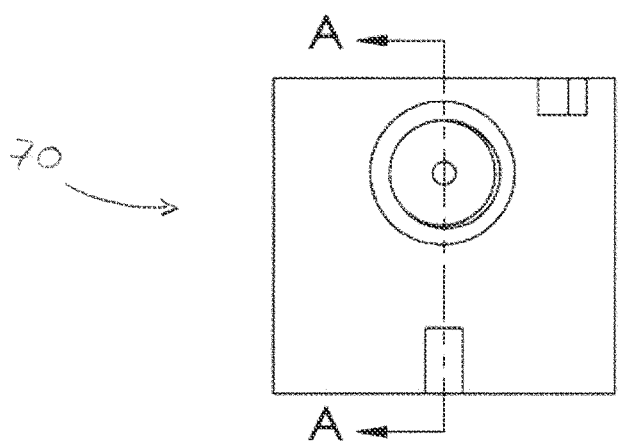
Figure 8C:
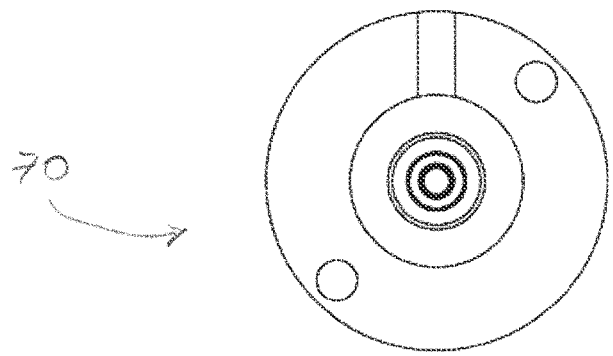
Figure 9:
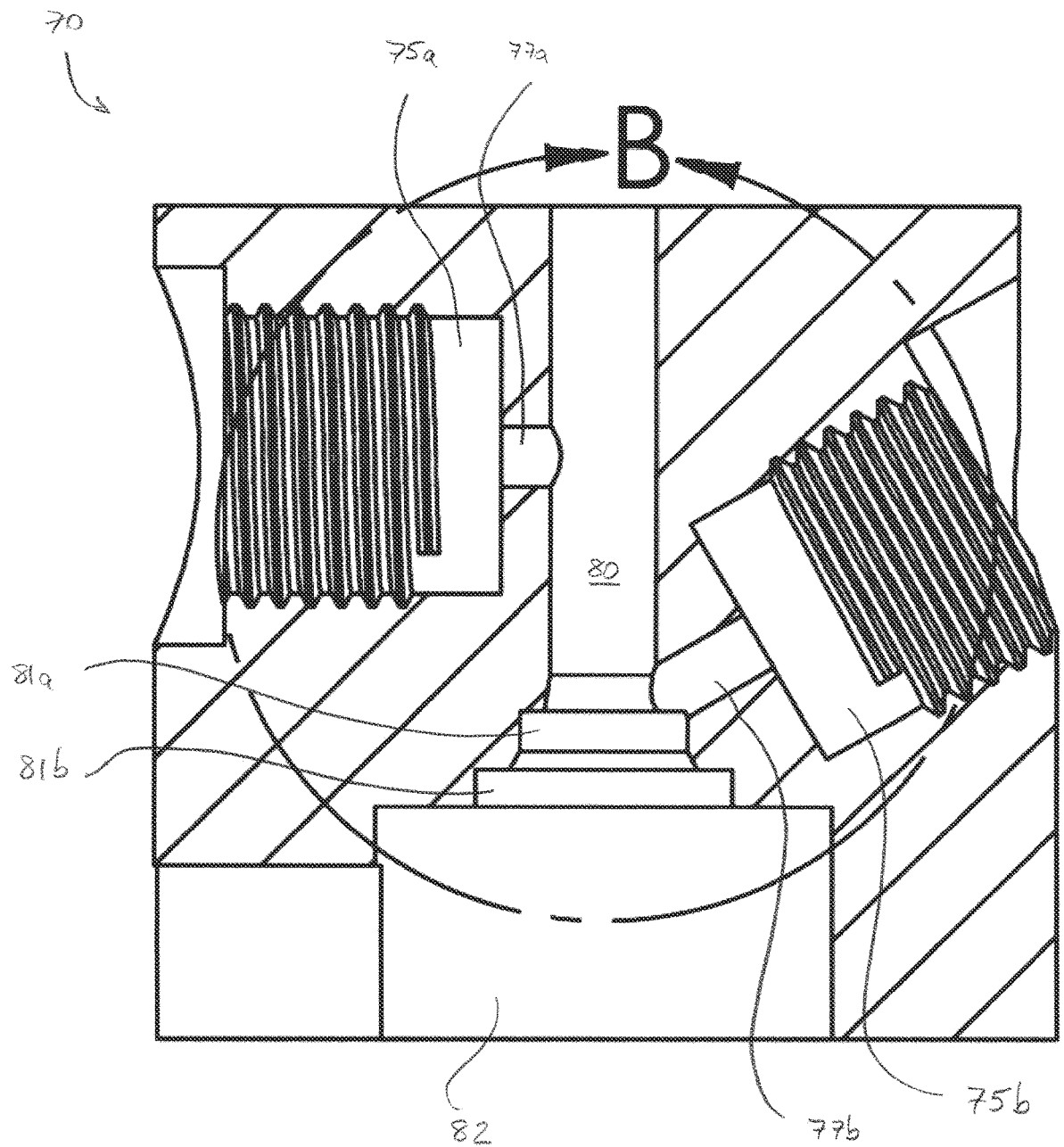
FIG. 9 is a cross-sectional view of the structural reinforcement of FIGS. 8A-8C in accordance with the present disclosure taken along line A-A of FIG. 8B.
Figure 10:
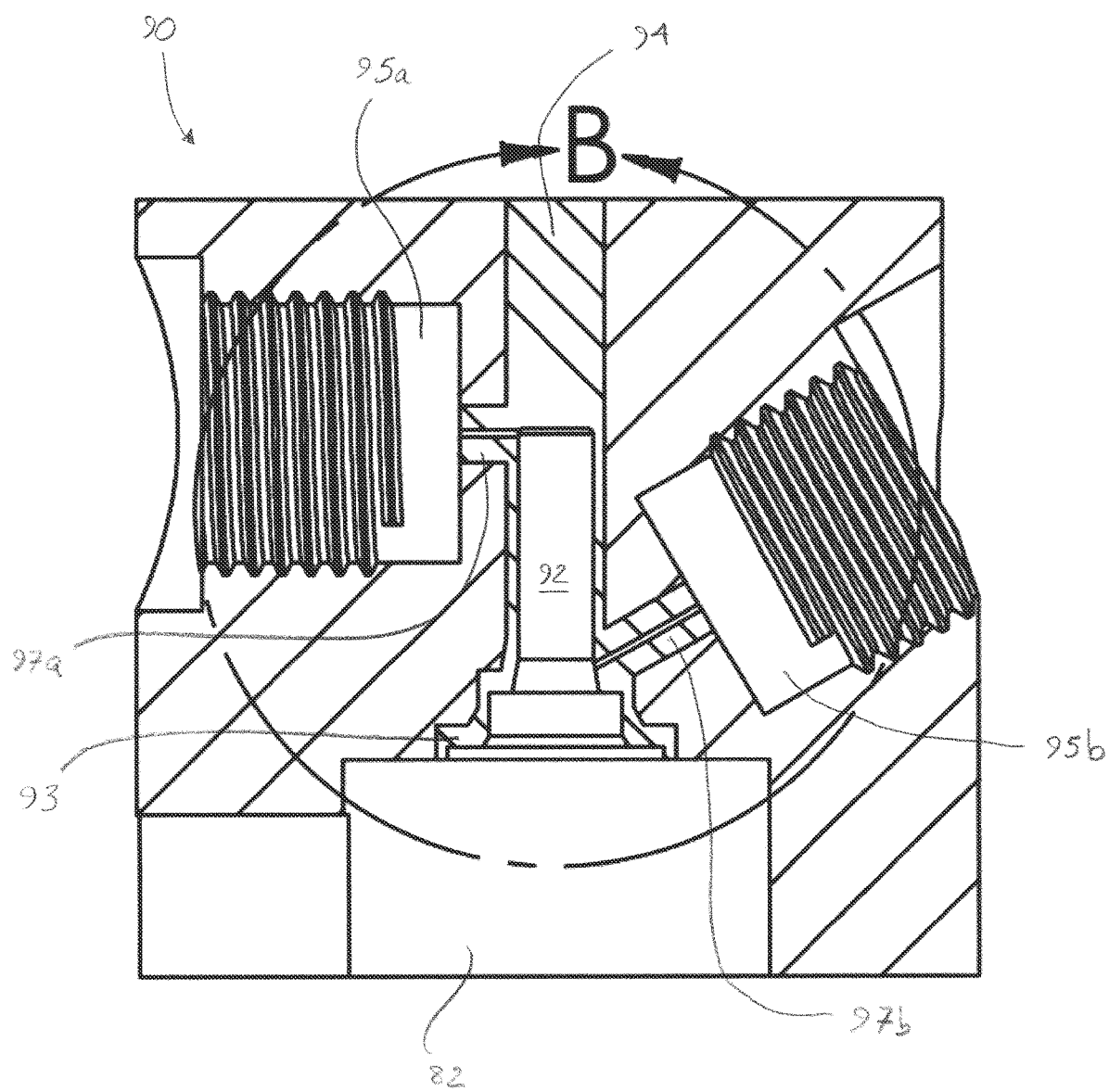
FIG. 10 is a detailed cross-sectional view of a portion of an alternative embodiment of a pump head in accordance with the present disclosure.

FIGS. 8-10 illustrate an alternative embodiment in accordance with the present disclosure. Referring first to FIGS. 8A-8C and 9, a pump head base 70 or reinforcement is shown. The pump head reinforcement 70 illustrated can be made of a material (e.g., reinforcing material), such as a stainless steel, or any of the other materials, metals, and/or alloys noted above. As shown in FIGS. 8A-8C and 9, the pump head base 70 provides a reinforcement shape having at least two internally threaded ports 75a, 75b therein, with the bottom of each of the ports having a pathway (77a and 77b, respectively) extending therefrom to a central passageway 80 in the pump head base 70. As shown in FIG. 9, the central passageway 80 extends through the pump reinforcement 70 and, at one end, ends in a portion 82 with a wider diameter. As also shown in FIG. 9, the central passageway 80 includes a series of different portions 81a, 81b, each having different diameters. It is to be noted that the different portions 81a, 81b, and/or 82 of the lower portions of the central passageway 80 as shown in FIGS. 8-9 may define the outline of a seat for removably receiving a piston of a pump (not shown) which is adapted to cooperate with the biocompatible pump head 90 shown in FIG. 10.

In one embodiment, a biocompatible material, such as polyetheretherketone (PEEK) may be injection molded into the pump head base 70 to provide a biocompatible coating or lining of the fluid pathways 77a, 77b and the central passageway 80 of the pump head base 70. The biocompatible coating lines the fluid pathways and provides a biocompatible pump head 90 such that, when used in an analytical instrument system, a fluid sample will not come into contact with the reinforcing material but will instead only come into contact with the biocompatible material (e.g., PEEK in this particular example).

A method for making a biocompatible pump head 90 in accordance with the present disclosure includes providing a pump head reinforcement 70, which may comprise a reinforcing material such as stainless steel, or any of the materials, metals or combinations noted above, with the reinforcement 70 having at least two ports 75a, 75b therein and having a central passageway 80, with pathways 77a, 77b providing fluid communication between the bottoms of the ports 75a, 75b and the central passageway 80. Core pins (not shown) may then be inserted into at least portions of the at least two ports 75a, 75b, the pathways 77a, 77b, and/or at least a portion of the central passageway 80. Once the core pin or pins have been placed as may be desired, the biocompatible material may be injected into the opening of the top portion of the central passageway 80 of the pump head reinforcement 70. As noted, the biocompatible material may comprise polyetheretherketone (PEEK) or any of the other biocompatible materials noted above. When the PEEK is injection molded into the pump head base 70, the PEEK will flow around the core pins and will coat the interior walls of the central passageway 80 and the fluid pathways 77a, 77b connecting the bottoms of the ports 75a, 75b and the central passageway 80. The core pin or pins may then be removed. Once the pin or pins are removed, additional machining (such as drilling) may be done to create fluid pathways through the PEEK in the pathways 77a, 77b connecting the bottoms of the ports 75a, 75b with the central passageway 80. In addition, machining some or all of the interior surface of the PEEK lining may be appropriate to achieve a desired surface finish for the PEEK lining surfaces.

The biocompatible pump head 90, such as shown in FIG. 10, due to the pump head base 70, is capable of operation as part of a pump that is able to withstand a wide variety of corrosive chemicals typically found in analytical chemistry, operating in a wide range of temperatures (e.g., −40 to 140° C.), and operating up to very high pressures, including up to at least 5,000 psi, 10,000 psi, 15,000 psi, and 20,000 psi.

After the biocompatible material is injection molded into (or otherwise added to) the pump head base 70, the resulting pump head 90 may be machined further, such as by milling, turning, or laser machining. The lining of the biocompatible material may be about 0.2 to 2.0 millimeters in thickness and that the surface finish of the lining of biocompatible material be about 0.05 to 0.8 µm average surface roughness ($R_a$).

FIG. 10 illustrates a biocompatible pump head 90 in accordance with the present disclosure. As shown in FIG. 10, the fluid pathways 97a, 97b connecting the bottoms of the ports 95a, 95b, in the pump head 90 to the central passageway 80 of the reinforcement 70 described above have a lining formed by PEEK, so that any fluid flowing through the bottoms of the ports 95a, 95b, the fluid pathways 97a, 97b, and the central passageway 92, as well as the portions of the passageway 92 have varying diameters, will not contact any reinforcing material but will only come into contact with the biocompatible material (which is PEEK in this example).

In FIG. 10, it can be seen that the biocompatible material 94 now fills up a portion of the central passageway 80 of the reinforcement 70, leaving a fluid pathway 92 extending partially through the pump head 90. FIG. 10 also shows that the interior surfaces of the portions 93 of the pump head 90 are lined or coated with the biocompatible material.

It will be appreciated by those skilled in the art that, although only a pump head base and resulting pump head are illustrated in the accompanying figures, the other components of a pump may be similarly coated with a biocompatible material so that the entire fluid pathway through all of the fluid passageways in the pump are biocompatible and the fluid moving through the pump does not come into contact with the reinforcing material of any of the pump components. Moreover, although the foregoing discussion focuses on a pump head for a pump, other components of an analytical system may similarly comprise biocompatible features, and the methods described herein may be used to make, for example, biocompatible check valves, and other types of valves.

While the disclosure has shown and described various embodiments, those skilled in the art will appreciate from the drawings and the foregoing discussion that various changes, modifications, and variations may be made without departing from the spirit and scope of the invention as set forth in the claims. For example, those skilled in the art will appreciate that the teachings herein can be used for a wide variety of implementations in an AI system, such as components for pumps, check valves and other valves, and the like. In addition, those skilled in the art will appreciate that the teachings herein can be implemented with a wide variety of process conditions, including various stationary phases and mobile phases, and at various operating pressures. As shown and described herein, the pump head reinforcement is unitary, but those of ordinary skill in the art will appreciate that the reinforcements described in the drawings and above discussion can be formed from separate and distinct components. Hence the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

We claim:

1. A biocompatible pump head for a pump comprising:
    a reinforcement body for a pump head comprising a reinforcing material and having first and second ports therein, each aperture coupled with a fluid pathway extending between the ports and a chamber in the reinforcement body, the chamber configured to receive a portion of a pump, wherein each fluid pathway has a diameter that is smaller than a diameter of the chamber; and
    a biocompatible layer lining each of the fluid pathways and the chamber of said reinforcement body, the biocompatible layer plugging a second end of the chamber and forming a continuous surface between the chamber and a portion of each of the first and second ports, wherein any fluid flowing through the ports, the fluid pathways, and the chamber only contacts the biocompatible layer,
    wherein said reinforcing material comprises metal, metal alloy, ceramic, polymer with carbon-fibers, a polymeric material, or a combination thereof.

2. The biocompatible pump head for a pump according to claim 1 wherein said reinforcing material comprises a first material and said biocompatible layer comprises a second material that is different than the first material.

3. The biocompatible pump head for a pump according to claim 1 wherein said biocompatible layer comprises polyetheretherketone (PEEK), polyphenylene sulfide (PPS), or polyetherketoneketone (PEKK).

4. The biocompatible pump head for a pump according to claim 3 wherein said pump head is able to withstand pressures of at least 5,000 psi.

5. The biocompatible pump head for a pump according to claim 3 wherein said pump head is able to withstand pressures of at least 10,000 psi.

6. The biocompatible pump head for a pump according to claim 3 wherein said pump head is able to withstand pressures of at least 15,000 psi.

7. The biocompatible pump head for a pump according to claim 3 wherein said pump head is able to withstand pressures of at least 20,000 psi.

8. An analytical instrument system comprising a pump, wherein said pump further comprises a pump head having a reinforcement body comprising a reinforcing material, a pump chamber, and first and second ports coupled with respective first and second fluid pathways therethrough, each fluid pathway extending between the first and second ports and the pump chamber in the reinforcement body, wherein each fluid pathway has a diameter that is smaller than a diameter of the pump chamber and the reinforcement body further comprises a biocompatible layer lining each of the pump chamber and the first and second fluid pathways, the biocompatible layer plugging a second end of the pump chamber and forming a continuous surface between the pump chamber and a portion of each of the first and second ports, wherein any fluid flowing through the ports, the fluid pathways, and the pump chamber only contacts the biocompatible layer, and wherein said reinforcing material comprises metal, metal alloy, ceramic, polymer having carbon-fibers or other fibers therein, or polymeric material, or a combination thereof, and said biocompatible layer comprises polyetheretherketone (PEEK), polyphenylene sulfide (PPS), or polyetherketoneketone (PEKK).

9. The analytical instrument system according to claim 8, wherein said reinforcing material comprises metal, metal alloy, ceramic, polymer having fibers therein, a polymeric material, or a combination thereof.

10. The analytical instrument system according to claim 8 wherein said pump head is able to withstand pressures of at least 5,000 psi.

11. The analytical instrument system according to claim 8 wherein said pump head is able to withstand pressures of at least 10,000 psi.

12. The analytical instrument system according to claim 8 wherein said pump head is able to withstand pressures of at least 15,000 psi.

13. The analytical instrument system according to claim 8 wherein said pump head is able to withstand pressures of at least 20,000 psi.

14. The analytical instrument system according to claim 8 wherein said analytical instrument system comprises at least one of a liquid chromatography system, an ion chromatography system, a high pressure liquid chromatography system, an ultra-high pressure liquid chromatography system, or a gas chromatography system.

15. A biocompatible pump head for a pump comprising:
a reinforcement body for a pump head comprising metal, metal alloy, ceramic, polymer having fibers therein, a polymeric material, or a combination thereof and having first and second ports therein, each port coupled with a fluid pathway therethrough, the fluid pathways extending between the ports and a chamber in the reinforcement body configured at a first end to receive a portion of a pump, wherein each fluid pathway has a diameter that is smaller than a diameter of the chamber and is configured to accommodate flow of a biocompatible material; and
a biocompatible layer lining each of the fluid pathways and the chamber of said reinforcement body, the biocompatible layer plugging a second end of the chamber and forming a continuous surface between the chamber and a portion of each of the first and second ports, wherein any fluid flowing through the ports, the fluid pathways, and the chamber only contacts the biocompatible layer.

16. The biocompatible pump head for a pump according to claim 15, wherein said biocompatible layer comprises polyetheretherketone (PEEK), polyphenylene sulfide (PPS), or polyetherketoneketone (PEKK).

17. The biocompatible pump head for a pump according to claim 15, wherein said pump head is able to withstand pressures of at least 5,000 psi.

18. The biocompatible pump head for a pump according to claim 15, wherein said pump head is able to withstand pressures of at least 10,000 psi.

19. The biocompatible pump head for a pump according to claim 15, wherein said pump head is able to withstand pressures of at least 15,000 psi.

20. The biocompatible pump head for a pump according to claim 15, wherein said pump head is able to withstand pressures of at least 20,000 psi.

21. The biocompatible pump head for a pump according to claim 15, wherein the reinforcement body comprises a polymer with carbon fibers.

22. The biocompatible pump head for a pump according to claim 15, wherein the biocompatible layer comprises a material that is different from the reinforcement body.

* * * * *